Inventors
Thomas J. Dunsheath
Henry N. Nerwin, Jr.
by Hill, Sherman, Meroni, Gross & Simpson Attys Inventors
Thomas J. Dunsheath
Henry N. Nerwin, Jr.
by Hill, Sherman, Meroni, Gross & Simpson Attys Jan. 15, 1963 T. J. DUNSHEATH ET AL 3,073,212

OPTICAL APPARATUS FOR INSPECTING MAGNETIC PARTICLE CONCENTRATIONS

Filed Aug. 14, 1957 4 Sheets-Sheet 3

Inventors
Thomas J. Dunsheath
Henry N. Nerwin, Jr.
by Hill, Sherman, Meroni, Gross & Simpson Attys Inventors
Thomas J. Dunsheath
Henry N. Nerwin, Jr.
by Hill, Sherman, Meroni, Gross & Simpson Attys United States Patent Office
3,073,212
Patented Jan. 15, 1963

3,073,212
OPTICAL APPARATUS FOR INSPECTING MAGNETIC PARTICLE CONCENTRATIONS

Thomas J. Dunsheath, Glenview, and Henry N. Nerwin, Jr., Chicago, Ill., assignors to Magnaflux Corporation, Chicago, Ill., a corporation of Delaware Filed Aug. 14, 1957, Ser. No. 678,150
3 Claims. (Cl. 88—14)

The present invention relates in general to magnetic particle inspection apparatus and more particularly concerns a photo electric scanning system associated with a dry powder method of magnetic particle inspection which automatically senses fault indications of material under test, marks the region of the flaw and tests the scanning system for proper operation during intervals in which material is not being inspected.

The dry powder method of magnetic particle inspection is especially useful in locating faults in the seam of large diameter resistance welded line pipe. In a system of this type, a magnetic yoke having opposing pole pieces with an air gap therebetween is energized with direct current to provide a relatively strong magnetic field in the air gap. The resistance welded line pipe is then passed through the air gap between the pole pieces and dry powder particles having a relatively high magnetic permeability are blown across the seam from a suitable hopper. When the seam is without flaw, the lines of magnetic force are distributed substantially uniformly throughout the wall of the pipe, and the distribution of powder across the pipe is substantially uniform. However, when there is a flaw in the seam of the pipe, the magnetic lines of force within the flaw will be sufficiently strong to effect the congregation of a large number of the powder particles over the flaw. An inspector may then note the regions along the seam where narrow elongated regions or lines of powder particles have gathered and thus determine the location of flaws in the seam.

The present invention contemplates and has as a primary object the automatic inspection of the pipe or other material under test to sense such localized regions of particle concentration. According to the invention, the dry powder blow over the seam has an optical characteristic which contrasts with that of the surface of the pipe or other material under test. A surface portion of the pipe or other material under test is optically scanned to detect such contrast.

A further feature of the invention is in the automatic marking of the location of such flaw so detected.

Another feature of the invention is in the coating of the pipe or other material under test with a background material having a uniform optical characteristic which provides a more distinct contrast with the optical characteristics of the dry powder. In the case of the testing of pipe seams, the coating is applied in a band or strip running along the seam.

Another object of the invention is the provision of means for automatically checking the contrast sensing system during the interval in which a pipe is not being inspected to determine that the scanning system is functioning properly. According to this aspect of the invention, an arrangement of limit switches indicate when testing of the pipe is complete, and appropriate control circuits intiate simulated contrasting characteristics of differing degrees which are scanned by the system. The response of the system to the simulated characteristics is compared with the response for proper operation. If such comparison reveals that the operation is improper, an alarm is automatically actuated.

Still another object of the invention is the provision of novel optical scanning means which reliably scan substantially the entire band of background material about the seam, thus enabling flaws to be detected despite variations in the angular orientation of the pipe seam about the axis along which the pipe travels during the inspection process. In this novel scanning system, there is provided means for illuminating the band, a photo cell, slit, rotatable mirror and lens. Light from the band passes through the focusing lens and is reflected by the mirror or other suitable reflecting surface so that it is deflected through the slit and upon the photo cell. To obtain the scanning effect, the mirror or other planar reflecting surface is secured to a rod whose axis is askew of the normal to the planar surface of the reflecting surface and means are provided for rotating the rod about its axis, thus varying the angle of reflection of light from the mirror to the slit. Since the angle of incidence equals the angle of reflection, the position on the band from which light rays emanate, varies as the mirror is rotated to produce the desired scanning effect.

A further object of the invention is the provision of a signal suitable for actuating additional equipment which automatically rejects a pipe when a flaw is indicated whereby repairs to the marked flaw may be promptly made and only flawless pipe passed on for delivery.

Other features, objects and advantages of the invention will become apparent from the following specification when read in connection with the accompanying drawing in which.

Figure 1:
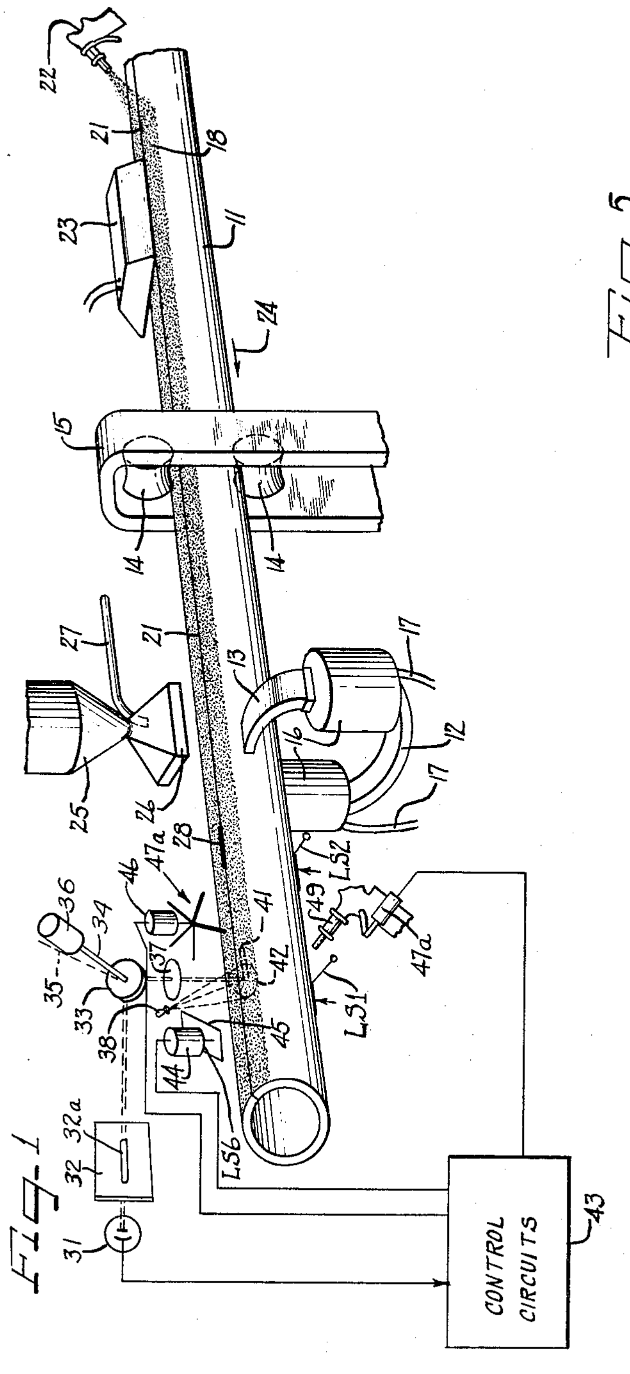
FIG. 1 is a combined block-pictorial diagram illustrating the overall automatic testing system.
Figure 5:
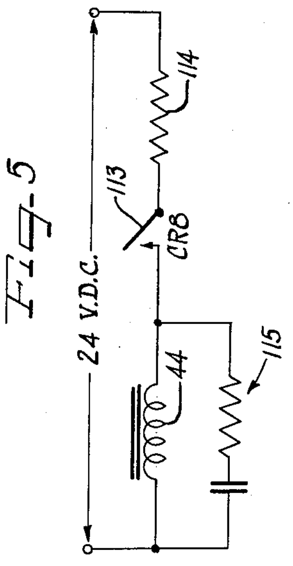
FIGS. 4, 5, 6 and 7 are line-to-line schematic circuit diagrams of the control circuits.

With reference now to the drawing, and more particularly FIG. 1 thereof, there is illustrated a block-pictorial diagram of the testing system. A length of resistance welded pipe 11, or cylinder of other material having relatively high magnetic permeability is moved in the air gap of magnetic yoke 12 which is between the pole pieces 13, one of which is not visible, by rollers 14 supported within frame 15. The coils 16 on yoke 12 are energized with direct current through wire pairs 17 to provide a relatively strong magnetic field in the air gap between pole pieces 13. A white band 18 shown stippled for clarity, is painted along and adjacent to seam 21 by spray gun 22 and rapidly dried by heating unit 23 as the pipe moves along the direction indicated by arrow 24. The latter heating unit may be a battery of infra-red lamps, or other suitable drying means.

Black dry magnetizable powder particles stored in hopper 25 are dusted across seam 21 through the mouth 26 of the hopper, compressed air being supplied through hose 27. When a flaw is present the black powder particles will congregate in a narrow elongated region or line along the seam and contrast with the white band 18. An example of such an indication of a flaw is the dark line 28.

Briefly, the explanation for the formation of such flaw indication lines is as follows. The direction of the magnetic field is essentially along a line of direction transverse to the pipe seam whereby north and south magnetic poles are effectively formed on respective sides of a flaw in the seam. The magnetizable powder particles are attracted to these poles to form a bridge of black powder over the flaw which appears as a black line, aligned essentially along the seam.

The scanning system includes photo tube 31, a member 32 having a slit 32*a* therein, a mirror member 33 having a planar reflecting surface and secured at its back side to rod 34 whose axis is askew of the normal 35 to planar reflecting surface of member 33, scanning motor 36 which rotates rod 34 about its axis, lens 37, and illuminating system 38. As illustrated, light passes upwardly from the upper surface of pipe 11 through the lens 37 to the mirror member 33 to be reflected therefrom in a generally horizontal direction, in a plane transverse to the axis of pipe 11, and to pass through the slit 32*a* to the photocell 31, member 32 being disposed in a plane parallel to the axis of the pipe 11. Rotation of rod 34 causes the angle between the normal to reflecting surface of member 33 and a line joining the latter and viewing slit 32 to vary. The area 41 from which light is reflected and passed through viewing slit 32*a* to photo tube 31 is elongated and its longitudinal axis or long direction is parallel to the seam 21 as shown in dotted lines in FIGURE 1. With rotation of the mirror member 33, the area 41 follows a circular path as indicated by dotted line 42, the longitudinal axis of area 41 remaining substantially parallel to seam 21.

When a black area such as the flow indication line 28 is scanned, the light to photo cell 31 is interrupted and sensed by the control circuits 43 which energizes solenoid 47*a* causing spray gun 49 to emit a jet of paint which marks the pipe to indicate the existence of a flaw. Limit switches LS1 and LS2 indicate when inspection of a length of pipe is complete, and respective control circuits energize rotary solenoid 44 causing card 45 to rotate clockwise whereby it assumes a position directly above white band 18, and test motor 46 is energized, causing five bars of different widths forming five simulated flaw indications to pass just above card 45 whereby they are respectively scanned to determine whether the flow sensing system is functioning properly.

Figure 2:
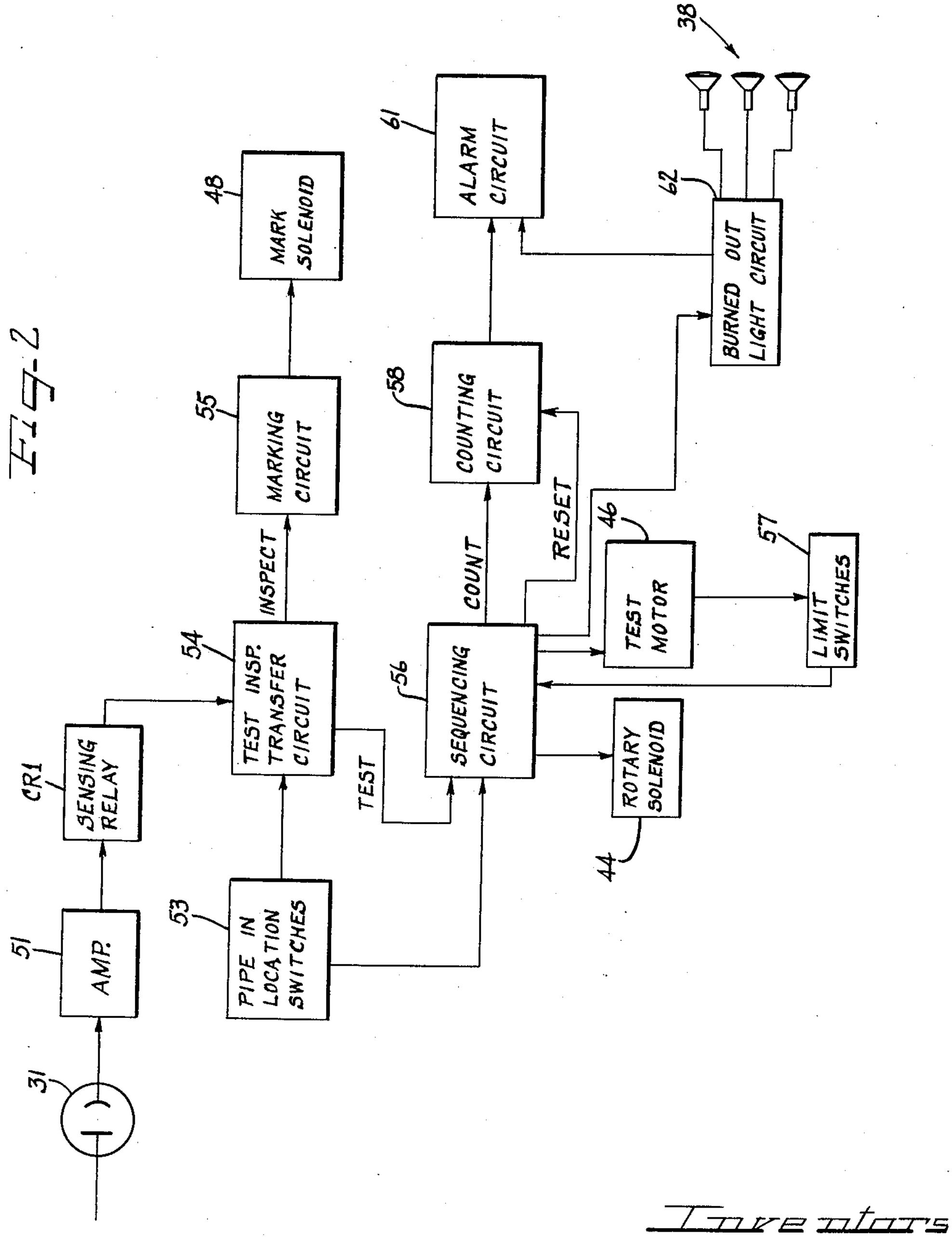
FIG. 2 is a block diagram of the electrical control system.

A general discussion of the electrical system will be helpful in understanding the detailed description of the electrical circuits. Wherever applicable, reference numerals which appear in earlier-mentioned portions of the drawing will identify corresponding elements in other portions of the drawings. With reference to FIG. 2, there is illustrated a block diagram of the electrical system. In response to the light to phototube 31 being interrupted for a predetermined length of time as a result of scanning a black area such as the flow indication line 28, amplifier 51 actuates sensing relay CR1, thereby indicating detection of a flow. Pipe in location switches 53 are limit switches positioned along the path travelled by pipe 11 and actuated by the latter to indicate initiation and termination of scanning for flaws. When the pipe is being scanned, a signal from test inspection transfer circuit 54 in response to actuation of sensing relay CR1 is coupled to marking circuit 55 which actuates mark solenoid 48, causing spray gun 49 (FIG. 1) to mark the flaw location on the pipe.

When the pipe in location switches 53 indicate that the pipe is no longer being inspected, sequencing circuit 56 is activated to start the test sequence and signals indicative of a flow being sensed are passed through test inspection transfer circuit 54 over the test line to sequencing circuit 56. Once the latter is activated, the following sequence of events is initiated. This sequence will be better understood by also referring to FIG. 1. The rotary solenoid 44 is energized moving card 45 beneath lens 37, test motor 46 is energized and associated limit switches cooperate with the latter whereby five bars of different widths, forming five simulated flaw indications 47 are rotated between lens 37 and background card whereby the five simulated flow indications are scanned. Each time sensing relay CR1 is actuated by one of the simulated flow indications being sensed, a signal is applied to counting circuit 58 which indicates the number of simulated flow indications thus sensed. If this number fails to correspond with the proper number for the desired circuit sensitivity, a signal is provided which activates alarm circuit 61. The latter is also activated if burned out light circuit 62 indicates that one of the lamps of illuminating means 38 is burned out. When counting is complete and no alarm has sounded, sequencing circuit 56 is effective in providing a signal on the designated reset line which resets counting circuit 58 to zero.

Figure 3:
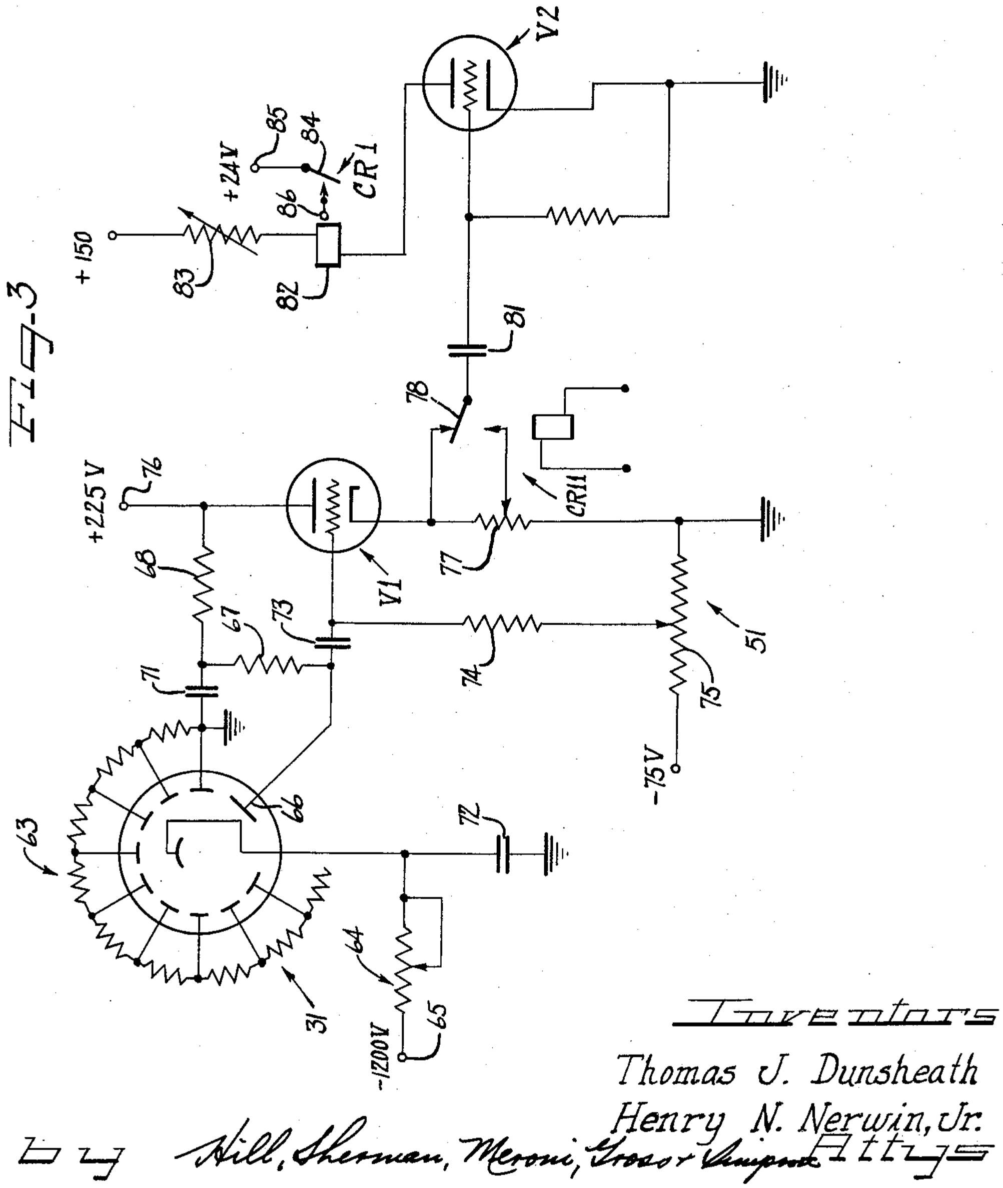
FIG. 3 is a schematic circuit diagram of the light sensitive photo tube and the associated electrical circuitry.

Having generally described the electrical system, it is appropriate to consider the electrical circuits in detail. With reference to FIG. 3, there is illustrated the photo tube 31, amplifier 51 and sensing relay CR1. Phototube 31 is preferably of the electron multiplier type and has an electron emitter and a ring of electron collectors biased to successively higher potentials by the biasing network which includes the ring of resistors 63 and adjustable resistor 64 connected between terminal 65 maintained at 1200 volts, and ground. The final collector 66 is biased at a positive potential through resistors 67 and 68, capacitors 71 and 72 serving bypass capacitors for spurious signals. The sensitivity of the photo tube is adjusted by varying variable resistance 64.

Tube V1 is normally non-conducting, but when light is interrupted to photo tube 31 whereby the current passing through collector 66 is appreciably reduced, the potential at the junction of resistor 67 and capacitor 73 rises. This rise is coupled to the grid of V1 through capacitor 73, and if sufficient, renders the latter tube conductive. Capacitor 73 with resistor 74 forms an integrating network which prevents spurious noise signals from erratically activating conduction. Variable resistance 75 may be adjusted to set the cut off potential coupled to the grid of V1, and thereby determining the change in potential required to activate conduction in tube V1. The plate of tube V1 is connected to terminal 76 which is maintained at a potential of 225 volts. When the later tube conducts, there is a corresponding rise in potential across cathode potentiometer 77 and this rise is coupled through relay contact 78 and capacitor 81 to the grid of tube V2. The latter is deenergized when the length of pipe is being inspected for flaws. However, when the scanning apparatus is tested during the interval between inspecting lengths of pipe, less sensitivity is required since the white background card 45 is closer to the illuminating lamps 38 and energization of control relay CR11 connects capacitor 81 to the arm of potentiometer 77 which may be adjusted to provide the desired sensitivity. Positive pulses derived across potentiometer 77 charge capacitor 81 through the diode action of tube V2, cutting off the latter to deenergize solenoid 82 of sensing relay CR1. Variable resistance 83 regulates the sensitivity of the latter relay. When solenoid 82 is de-energized, contacts 84 are closed and the 24 volt potential on terminal 85 is connected to terminal 86. The effects of this and the conditions for energizing and deenergizing control relay CR11 will be discussed in detail below.

Figure 4:
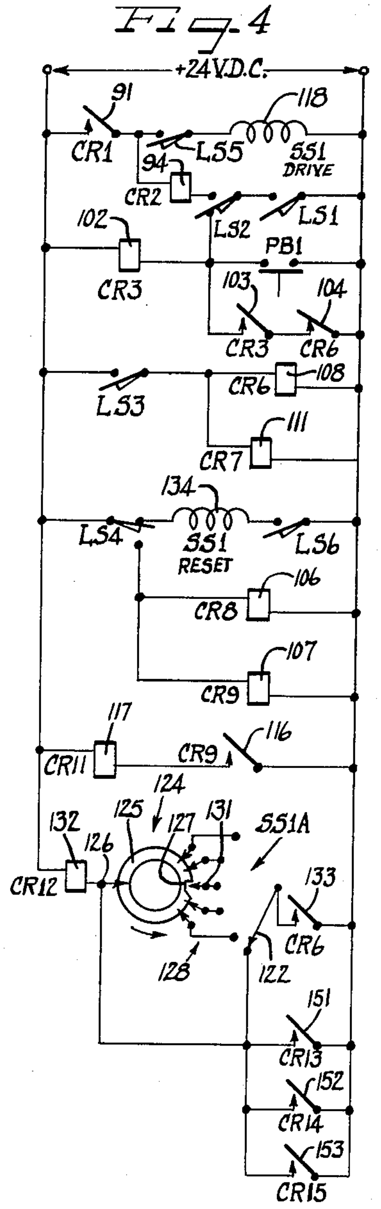
Figure 6:
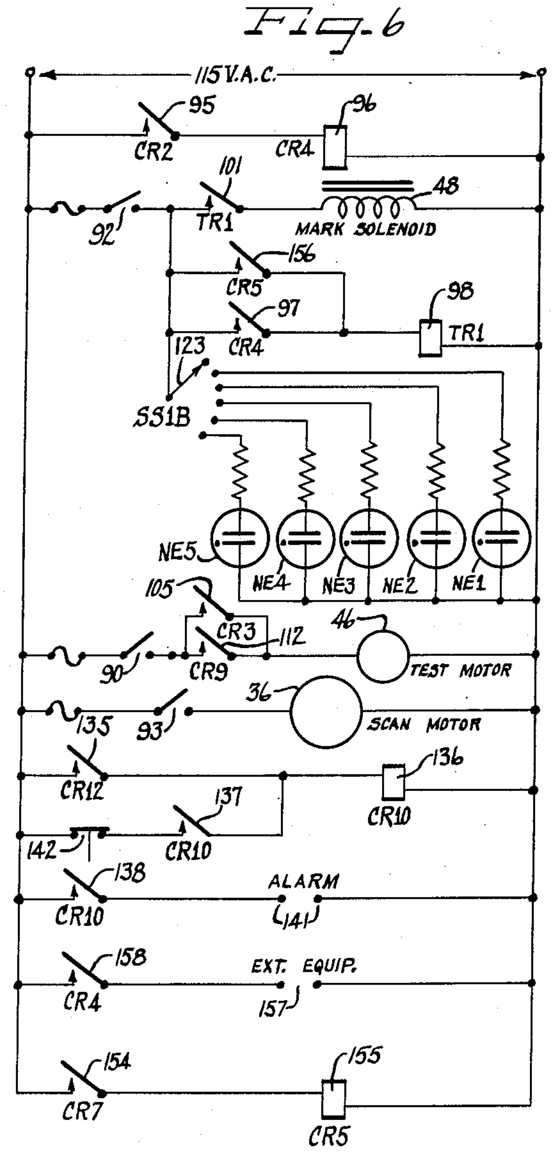

In the detailed discussion of the electrical control system which follows, reference will be made to FIGS. 4, 5, 6 and 7. With reference to FIG. 4, there is illustrated the schematic diagram of solenoids, switches and relay contacts which are connected across a source of 24 volt D.C. potential. Switch positions and the position of relay contacts are illustrated in their normal position and parts of a particular relay, solenoid or switch are identified by an associated alphanumeric symbol. Thus, the contacts 91 are identified by the designation CR1 to associate those contacts with relay CR1 in FIGS. 2 and 3. The scanning system becomes operable when switches 90, 92 and 93 of FIG. 6 are closed, one effect being to energize scan motor 36.

When a flaw indication is sensed by the scanning system, control relay CR1 is activated closing contacts 91. With a length of pipe position for inspection, limit switches LS2 and LS3 are closed and the solenoid 94 of control relay CR2 is energized, closing the contacts 95 (FIG. 6) and energizing the solenoid 96 of control relay CR4. The contacts 97 of the latter relay are closed to energize the solenoid 98 of timing relay TR1, the contacts 101 remaining closed for a period of time determined by the delay setting on timing relay TR1. When the latter contacts are closed mark solenoid 48 is energized and the solenoid operated air valve on spray gun 49 is opened, thereby marking the pipe as defective vicinity of the flaw.

Automatic test operation is initiated during the last nine inches of pipe travel when limit switch LS2 is opened while limit switch LS1 remains closed, thereby energizing the solenoid of control relay CR3 and causing contacts 103 to close hold solenoid 102 energized as a result of the normally closed contacts 104 of control relay CR6. The contacts 105 (FIG. 6) of control relay CR3 are closed whereby test motor 46 is energized. As the latter motor moves from its rest position, limit switch LS4 is deactuated and the solenoid 106 and 107 of control relays CR8 and CR9 respectively are accordingly energized. Associated with rest motor 46 is a cam, described below in connection with FIG. 8, which is effective in actuating limit switch LS3 after rotation through 90°. This energizes solenoids 108 and 111 associated with control relays CR6 and CR7 respectively. The normally-closed contacts 104 of control relay CR6 are opened, deenergizing the solenoid 102 of control relay CR3. However, test motor 46 remains operative since the contacts 112 of control relay CR9 are closed while its associated solenoid 107 is energized. When a revolution has been completed, the cam actuates limit switch LS4 deenergizing solenoids 106 and 107 which results in contacts 112 opening and test motor 46 being deenergized.

The background card 45 (FIG. 1) is moved into position when the cam releases limited switch LS4, it being recalled that solenoid 106 (FIG. 4) was then energized, thereby closing the associated contacts 113 (FIG. 5) to energize rotary solenoid 44. In series with this solenoid is a current limiting resistance 114 and across the latter solenoid is a resistance capacitance impulse damping network 115. When the test motor completes one revolution, limit switch LS4 is again actuated and solenoid 106 of control relay CR8 is deenergized, its contacts 113 opened and rotary solenoid 44 accordingly deenergized. Thus, the background card will swing into test position shortly after test motor 46 starts and remain there until it has stopped.

As indicated above, less amplification is required from the phototube amplifying circuit during the test interval and the gain is reduced by actuating control relay CR11. This occurs when control relay CR9 is energized, the contacts 116 of the latter relay completing the circuit which energizes solenoid 117 of control relay CR11.

Turning now to the counting circuit, it includes a stepping switch designated SS1. The drive coil 118 of this switch is ready for operation when limit switch LS5 is closed in response to the background card 45 reaching its full test position. Thus, each time the contacts 91 of control relay CR1 close, stepping switch SS1 is stepped one position. As the simulated flaw indications 47 pass beneath lens 37, control relay CR1 will operate once for each simulated flaw indication to which the scanning circuit responds with a sufficiently large signal. The number of times the latter control relay is energized is dependent upon the sensitivity of the electronic scanning circuit and may vary from zero in the least sensitive position to five in the most sensitive position. Hence, stepping switch SS1 will step zero to five steps.

Stepping switch SS1 includes two banks of contacts, one designated SS1A (FIG. 4); the other, SS1B (FIG. 6). The arms 122 and 123 of the latter banks of contacts move together. Bank SS1B is effective in selecting for illumination one of the neon bulbs NE1 through NE5, the illuminated bulb being indicative of the number of counts then sensed. Bank SS1A is associated with the sensitivity level check switch 124 which has a rotating conducting ring 125 always connected to contact 126 and has a slot 127 whereby all but one of the fixed contacts 128 are in contact with ring 125. The slot 127 accommodates the fixed contact associated with the test count which should be sensed when sensitivity of the scanning circuit is normal. Usually sensitivity of the system is adjusted so that a count of three is sensed at the end of the test interval. Accordingly, slot 127 is shown in FIG. 4 centered about the third fixed contact 131. If greater or less sensitivity is desired, ring 125 is rotated in the appropriate direction. If stepping switch SS1 steps any number other than that number for which switch 124 is set then solenoid 132 of control relay CR12 will be energized through the contacts of switch 124 and the contacts 133 of control relay 6, it being recalled that the solenoid 108 of control relay CR6 was energized when limit switch LS3 was actuated, and the alarm circuit is activated in a manner to be described below. Should operation be normal with no alarm indication, limit switch LS6, which was closed when test motor 46 began rotating, in cooperation with limit switch LS4, which closes after a single revolution of the latter motor, complete the circuit to the reset solenoid 144 of switch SS1, returning the latter switch to its zero position.

Recalling that an alarm condition is indicated by energization of solenoid 132 of control relay CR12, the contacts 135 (FIG. 6) of the latter close to energize solenoid 136 of control relay CR10 which remains energized by virtue of the holding action of contacts 137. The contacts 138 of control relay CR10 close to energize the alarm terminals 141 which remain energized, indicating an alarm condition until push button 142 is depressed whereby solenoid 136 of control relay CR10 is deenergized. When an alarm condition is indicated, one monitoring the equipment operation may readily determine whether the sensitivity was too high or low by noting which neon bulb was illuminated. If for example, the correct indicated count should be three and the actually indicated count was four, it is known that the circuit is too sensitive and appropriate corrective action may be readily taken.

Figure 7:
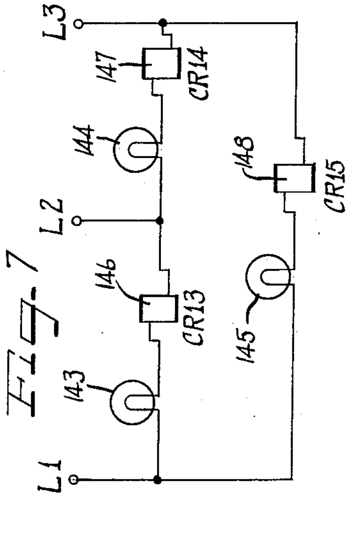

Another cause for an alarm is the burning out of one of the light source bulbs 143, 144 or 145 schematically represented in FIG. 7. These three lamps comprise light source 38 of FIG. 1 in a preferred embodiment. While the system is operative with a single bulb, there are certain advantages to utilizing three bulbs delta-connected to a three phase line. The three phases are represented as L1, L2 and L3 in FIG. 7. It is seen that lamp 143 and the solenoid 146 of control relay CR13 are connected between L1 and L2, lamp 144 and the solenoid 147 of control relay CR14 between L2 and L3, and lamp 145 and the solenoid 148 of control relay CR15 between L1 and L3. With this arrangement a more uniform illumination of the surface is obtained since the time at which the respective lamps are energized with a maximum potential is staggered from the others by a time interval corresponding to a phase difference of 120°.

Should one of the lamps burn out, the advantages of the arrangement would be lessened. To promptly discover such a defect, control relays CR13, CR14 and CR15 have been connected as shown. The respective contacts of these relays 151, 152 and 153 are shown in FIG. 4 and are normally open when the associated solenoids 146, 147 and 148 respectively are energized. However, when one of the lamps burns out, the associated solenoid is deenergized and the associated relay contacts close energizing the solenoid 132 of control relay CR12 which in turn activates the alarm circuit as described above.

Another feature of the invention is a spray gun clearing circuit. Since usually the pipe under inspection has no flaws, there may be long intervals during which the marking spray gun 49 (FIG. 1) is not activated and the marking paint may dry and clog the nozzle. Clearing is effected when limit switch LS3 is actuated by the cam of test motor 46, thereby energizing solenoid 111 of control relay CR7. The contacts 154 (FIG. 6) of control relay CR7 close the circuit to the solenoid 155 of control relay CR5 whose contacts 156 initiate operation of spray gun 49.

Still another feature of the invention is the provision of a signal which may be utilized to energize external equipment for removing a defective pipe from the assembly line. When control relay CR2 is energized, indicating detection of a flaw in pipe under inspection, contacts 95 (FIG. 6) are closed, energizing solenoid 96 of control relay CR4. The contacts 158 of the latter are closed to energize external equipment terminals 157 which may be utilized for activating equipment which removes the defective pipe from the line.

Figure 8:
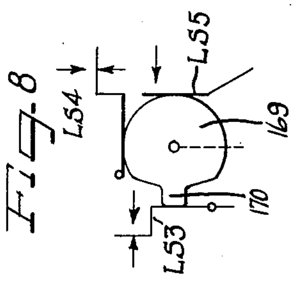
FIG. 8 illustrates the relation between a cam, which is rotated by the test motor operative when the scanning system is tested, and the limit switches it actuates.

With reference to FIG. 8 there is illustrated cam 169 which is rotated by test motor 46. In the position illustrated, tab 170 of tab 169 has actuated limit switch LS3 thus initiating the sequence of events described above. In the rest position tab 170 is substantially vertical and closes switch LS4 in the manner in connection with the circuit of FIG. 4. After 90° of rotation, limit switch LS3 is actuated. After substantially completing a revolution, limit switch LS5 is actuated for an instant simultaneously with limit switch LS4 being in its normal rest position to enable reset solenoid 134 (FIG. 4) of switch SS1 to be energized and reset to zero.

The system described above is thus seen to provide fully automatic detection of flaws in the seam of a resistance welded pipe, automatic self-checking of the testing circuit, and not only indication of a length of pipe having a defective seam, but also where the flaw in the seam is located. The system need not be continuously monitored since an automatic alarm indication is provided when a malfunction occurs.

While other types of scanning systems may be employed, it is to be noted that the system herein described includes a novel scanner of simple structure, yet providing a relatively wide area of scan. It is apparent that those skilled in the art may make numerous modifications of and departures from the specific embodiments described herein without departing from the inventive concepts. Consequently the invention is to be construed as limited only by the spirit and scope of the appended claims.

We claim as our invention:

1. Apparatus for optically testing a test piece of magnetic material to detect flaws oriented primarily in a certain flaw direction, comprising: means for magnetizing said test piece in a direction generally transverse to the flaw direction, means for distributing magnetizable material over a surface of said test piece to be concentrated over regions having flaws therein, said material having an optical characteristic which contrasts with that of said surface, a light source, a lens, a mirror, a member having an elongated slit therein and a photocell, said slit having its long dimension oriented in parallel relation to the flaw direction for restricting the transmission of light reflected to said photocell to that corresponding to a narrow region of said surface lying parallel to the flaw direction, and means for moving said mirror to scan the light reflected from said narrow region over said slit, whereby the light incident upon said photocell is decreased in the presence of a flaw thereby generating a signal indicative of a flaw in said magnetic test piece.

2. Apparatus for testing an optical scanning system which is arranged to provide a response when sensing a color element such as a simulated flaw which exceeds a predetermined width comprising, a background card having a first optical characteristic, means for positioning said background card within the area scanned by said scanning system, a plurality of bars having different widths of predetermined dimensions and having a second optical characteristic affording a color contrast with the first optical characteristic for said background card, means mounting said bars along radii extending from and orthogonal to an axis normal to said background card, means for rotating said bars about said axis in color contrast relation to said background card and means on the opposite side of said bars from said background card for evaluating and indicating light variations produced by the rotation of said bars relative to said background card.

3. Apparatus for testing an optical scanning system which provides a response to a slit whose area exceeds a predetermined value comprising a rotary solenoid with an attached background card whereby energization of said solenoid rotates said background card within the region scanned by said scanning system, a test motor which rotates a plurality of bars of different widths about an axis substantially perpendicular to the plane of said background card whereby said bars sequentially pass between said scanning system and said background card, said bars having a color characteristic such as to afford color contrast with said background card, means for energizing said rotary solenoid and said motor whereby said plurality of bars each pass once between said scanning system and said background card, means for counting the number of bars to which said scanning system responds, and means for rendering an indication when the number thus counted is different from a predetermined number.

References Cited in the file of this patent

UNITED STATES PATENTS

| | | |
|---|---|---|
| 1,960,898 | De Forest | May 29, 1934 |
| 2,246,906 | Viebahn et al. | June 24, 1941 |
| 2,267,999 | Switzer | Dec. 30, 1941 |
| 2,354,628 | Whitesell | July 25, 1944 |
| 2,365,253 | De Forest et al. | Dec. 19, 1944 |
| 2,393,631 | Harrison et al. | Jan. 29, 1946 |
| 2,495,544 | Peterson et al. | Jan. 24, 1950 |
| 2,502,503 | Berkley | Apr. 4, 1950 |
| 2,576,043 | Rendel | Nov. 20, 1951 |
| 2,604,809 | Mitchell | July 29, 1952 |
| 2,678,421 | Dunsheath | May 11, 1954 |
| 2,719,235 | Emerson | Sept. 27, 1955 |
| 2,750,519 | Summerhayes et al. | June 12, 1956 |
| 2,791,696 | Schell | May 7, 1957 |
| 2,953,963 | Bulkley et al. | Sept. 27, 1960 |